(12) United States Patent
Karande et al.

(10) Patent No.: US 11,017,048 B2
(45) Date of Patent: May 25, 2021

(54) SYNCHRONIZED CONTENT REPLICATION

(71) Applicant: Box, Inc., Redwood City, CA (US)

(72) Inventors: Advait D. Karande, Foster City, CA (US); Jason Lin, Cupertino, CA (US); Ryan Knotts, San Jose, CA (US)

(73) Assignee: Box, Inc., Redwood City, CA (US)

( * ) Notice: Subject to any disclaimer, the term of this patent is extended or adjusted under 35 U.S.C. 154(b) by 38 days.

(21) Appl. No.: 16/231,274

(22) Filed: Dec. 21, 2018

(65) Prior Publication Data
US 2020/0201918 A1     Jun. 25, 2020

(51) Int. Cl.
| | |
|---|---|
| *G06F 16/955* | (2019.01) |
| *H04L 29/08* | (2006.01) |
| *G06F 16/907* | (2019.01) |
| *G06F 16/954* | (2019.01) |

(52) U.S. Cl.
CPC .......... *G06F 16/955* (2019.01); *G06F 16/907* (2019.01); *G06F 16/954* (2019.01); *H04L 67/1095* (2013.01)

(58) Field of Classification Search
CPC .... G06F 16/955; G06F 16/907; G06F 16/954; H04L 67/1095
USPC ........................................................ 709/218
See application file for complete search history.

(56) References Cited

U.S. PATENT DOCUMENTS

| | | | | |
|---|---|---|---|---|
| 9,395,892 | B1 * | 7/2016 | Beausoleil | ............ G06F 40/166 |
| 9,773,051 | B2 * | 9/2017 | Smith | ................ G06F 16/1824 |
| 2005/0050088 | A1 * | 3/2005 | Kotler | .................... G06F 40/18 |
| 2006/0200556 | A1 | 9/2006 | Brave | |
| 2010/0185955 | A1 | 7/2010 | Kato | |
| 2011/0106876 | A1 * | 5/2011 | Delaney | ................ H04L 63/102 |
| | | | | 709/203 |
| 2012/0324373 | A1 | 12/2012 | Halliday | |
| 2012/0331108 | A1 * | 12/2012 | Ferdowsi | ...................... 709/219 |

(Continued)

FOREIGN PATENT DOCUMENTS

WO    WO-2015089418 A2 *   6/2015          G06F 11/1662

OTHER PUBLICATIONS

"Filing Handling", Microsoft Docs, URL:https://docs.microsoft.com/en-us/windows-hardware/test/assessments/file-handling, May 5, 2017.

(Continued)

*Primary Examiner* — Zi Ye
(74) *Attorney, Agent, or Firm* — Vista IP Law Group, LLP

(57) ABSTRACT

Content management in a collaboration system. Ease-of-use of shared content is facilitated. A URL is presented in a user interface. The system determines (e.g., based on user preferences) whether to display the content corresponding to the URL in a browser at the user device, or whether to display the content corresponding to the URL using a non-browser application. If the user device is configured to display the content corresponding to the URL using a non-browser application, then when the user clicks or touches or hovers, or otherwise indicates a selection of a URL, the system displays the content using the non-browser application. In this situation, the system retrieves the content from the collaboration system, stores a local instance of the content in local storage of the user device, and opens the local instance using the non-browser application. Local instance edits are synchronized with the collaboration system using a synchronization protocol.

20 Claims, 10 Drawing Sheets

(56) References Cited

U.S. PATENT DOCUMENTS

| | | | |
|---|---|---|---|
| 2013/0198145 A1* | 8/2013 | Avery | G06F 16/10 |
| | | | 707/687 |
| 2014/0020080 A1 | 1/2014 | Antypas, III | |
| 2014/0229455 A1* | 8/2014 | Bestler | G06F 16/1752 |
| | | | 707/695 |
| 2015/0112927 A1* | 4/2015 | Lee | G06F 16/178 |
| | | | 707/610 |
| 2016/0087997 A1* | 3/2016 | Chastain | H04L 63/123 |
| | | | 726/6 |
| 2016/0127452 A1* | 5/2016 | Newman | G06F 16/178 |
| | | | 709/203 |
| 2016/0321462 A1 | 11/2016 | Bhogal | |
| 2018/0026984 A1 | 1/2018 | Maker et al. | |
| 2018/0067903 A1 | 3/2018 | Maker et al. | |

OTHER PUBLICATIONS

Ted Hudek et al., "Filter Drivers", Microsoft Docs, URL:https://docs.microsoft.com/en-us/windows-hardware/drivers/kernel/filter-drivers, Jun. 16, 2017.

"Minifilter Diagnostics", Microsoft Docs, URL:https://docs.microsoft.com/en-us/windows-hardware/test/assessments/minifilter-diagnostics, May 5, 2017.

"Package a job and run it on another computer", Microsoft Docs, URL:https://docs.microsoft.com/en-us/windows-hardware/test/assessments/package-a-job-and-run-it-on-another-computer, May 5, 2017.

Ted Hudek et al., "Windows Driver Model (WDM)", Microsoft Docs, URL:https://docs.microsoft.com/en-us/windows-hardware/drivers/kernel/windows-driver-model, Jun. 16, 2017.

EMC Documentum Content Transformation Services Transformation Suite Version 7.2 Administration Guide, 2016.

\* cited by examiner

SYNCHRONIZED CONTENT REPLICATION

FIELD

This disclosure relates to content management systems, and more particularly to techniques for synchronized content replication to a user device.

BACKGROUND

Users of the World Wide Web routinely use uniform resource locators (URLs) to identify and/or locate an instance of a resource that is stored a remote location on the web. The ability to use URLs to identify and locate a single content object that is accessible and editable by multiple users has greatly facilitated collaboration. As an example, a single computer-readable content object (e.g., a text file, a spreadsheet, a mixed text and graphics document, programming code, etc.) that is stored at a remote storage facility (e.g., cloud-based storage facility) can be operated over by multiple collaborators. Prior to having such an ability, each collaborator might have maintained a copy of a particular file on their own user device (e.g., laptop computer, deskside computer, etc.) and coordinated with other collaborators as to who has the most current version of the file and/or who has the edit token, so as to avoid conflicts while editing.

In contrast, the ability for any user to refer to a single copy of a remotely-stored content object stored (e.g., through use of a URL) facilitates collaboration. So long as there is some mechanism in place to manage editing conflicts (e.g., when two collaborators attempt to concurrently edit a file), only the one version of a shared content object needs to be maintained. This remote access model has been extremely successful, and collaborators routinely refer to content objects by their URL in day-to-day communications. For example, a URL of a document to be shared with collaborators might be included in an email or other document. When the recipient of the URL is online, the user can merely click on the URL to invoke a browser capability that facilitates access to the shared document.

Being online, however, is not always feasible or efficient. This is particularly true as mobile computing using smart phones and other mobile devices has become more prevalent. In response to the need to access shared content objects from anywhere and on any user device, whether or not the user device is at that moment online, certain synchronization capabilities have been developed to download an instance (e.g., copy) of a shared collaboration object from a remote repository to as many user devices (e.g., mobile devices) as there are collaborators or collaborator devices. When a user makes a change to their local copy of the content object (e.g., stored on their mobile device), the synchronization capability communicates the change to the remote repository. Such synchronization capabilities often bring additional capabilities to bear, such as the ability to use native applications that are locally installed on the user device and that rely on a local copy of a content object. With the foregoing synchronization model, a document that is referred to by its URL can be downloaded to a user device, managed (e.g., edited) locally by a native application, and synchronized with a shared copy of the document that is stored at a remote repository.

Unfortunately, facilities for seamlessly and efficiently transitioning from a remote access model where remotely-stored content objects are accessed through a URL to a synchronized model where locally-stored documents are accessed through the native capabilities of a user device have not yet been developed. What is needed is a way to seamlessly transition shared content object collaboration activities from a remote access model to a synchronized model.

SUMMARY

The present disclosure describes techniques used in systems, methods, and in computer program products for web-to-local content replication, which techniques advance the relevant technologies to address technological issues with legacy approaches. More specifically, the present disclosure describes techniques used in systems, methods, and in computer program products for replication of remote content objects to a synchronized local computing environment. Certain embodiments are directed to technological solutions for invoking a protocol to automatically replicate a remotely-stored instance of a content object to a locally-stored and synchronized instance of the content object.

The disclosed embodiments modify and improve over legacy approaches. In particular, the herein-disclosed techniques provide technical solutions that address the technical problem of seamlessly mixing a URL-based content object sharing model with a locally-stored and synchronized content object sharing model. Various applications of the herein-disclosed improvements in computer functionality serve to reduce the demand for computer memory, reduce the demand for computer processing power, reduce network bandwidth use, and reduce the demand for inter-component communication. Strictly as one example, the ordered combination of steps of the embodiments implement a protocol to automatically replicate a remotely-stored instance of a content object to a locally-stored and synchronized instance of the content object. These embodiments are more efficient at least in that many browser and file system actions can be performed automatically (i.e., under program control), which eliminates a large set of user interface interactions as well as a corresponding set of network I/O (input/output or IO) operations that pertain to user feedback that is often needed when performing user interface interactions to access remotely-stored content objects.

Some embodiments disclosed herein improve the functioning of multiple systems within the disclosed environments, and some embodiments advance peripheral technical fields as well. As specific examples, use of the disclosed computer equipment, networking equipment, and constituent devices within the shown environments as described herein and as depicted in the figures provide advances in the technical field of distributed data management.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
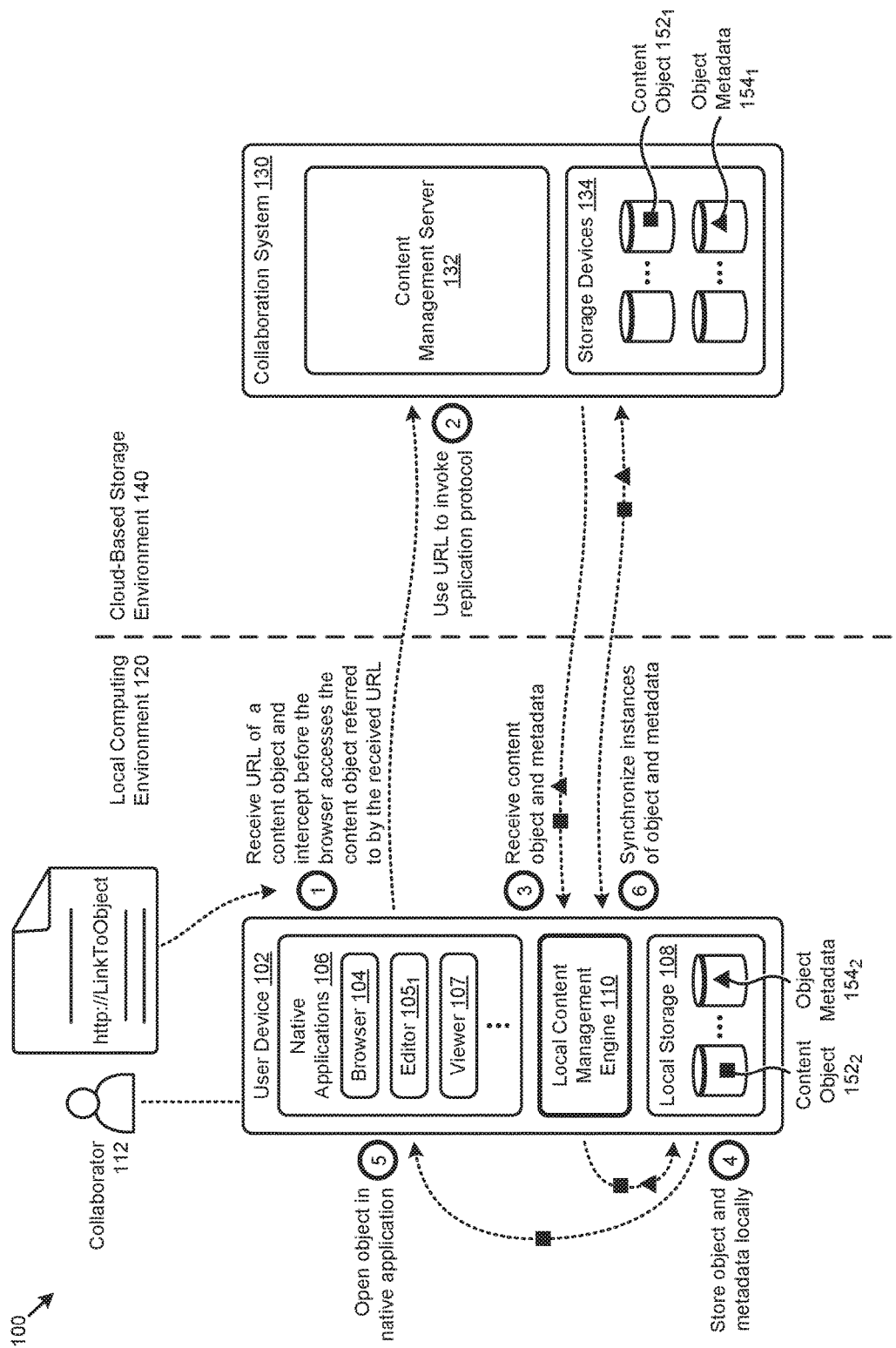
FIG. 1 illustrates a computing environment in which embodiments of the present disclosure can be implemented.

Embodiments in accordance with the present disclosure address the problem of seamlessly mixing a URL-based content object sharing model with a locally-stored and synchronized content object sharing model. Some embodiments are directed to approaches for invoking a protocol to automatically replicate a remotely-stored instance of a content object to a locally-stored and synchronized instance of the content object. The accompanying figures and discussions herein present example environments, systems, methods, and computer program products for replication of remote content objects to a synchronized local computing environment.

Overview

Disclosed herein are techniques for invoking a protocol to automatically replicate a remotely-stored instance of a content object to a locally-stored and synchronized instance of the content object. In certain embodiments, the protocol is invoked by a single user action at a local user device, such as clicking a URL that corresponds to the remotely-stored content object. When the URL is clicked, the user device issues a request (e.g., HTTP request) to access the content object. A response that comprises the then-current version of the content object and metadata associated with the content object is returned to the user device. The local instance of the content object and associated metadata are then stored at the user device. In certain embodiments, the protocol opens the content object in a native non-browser application that corresponds to the content object type. In certain embodiments, the protocol facilitates synchronization of the locally-stored instance of the content object with the remotely-stored instance of the content object.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1 illustrates a computing environment 100 in which embodiments of the present disclosure can be implemented. As an option, one or more variations of computing environment 100 or any aspect thereof may be implemented in the context of the architecture and functionality of the embodiments described herein.

FIG. 1 illustrates one aspect pertaining to invoking a protocol to automatically replicate a remotely-stored instance of a content object to a locally-stored and synchronized instance of the content object. Specifically, the figure presents a logical depiction of how the herein disclosed techniques can be implemented in a computing environment that comprises a cloud-based storage environment and multiple instances of local computing environments to perform replications of remote content objects at the cloud-based storage environment to synchronized instances of the content objects at the local computing environments.

The logical depiction of FIG. 1 illustrates a cloud-based storage environment 140 and one representative instance of a local computing environment 120. The cloud-based storage environment 140 comprises a cloud-based implementation of a collaboration system 130 that facilitates collaboration over large volumes of shared content by a plurality of users (e.g., collaborators). The collaboration system 130 can comprise one or more instances of content management server 132, each having access to various instances of storage devices 134 that store the shared content. As an example, a content object 152₁ might be stored on or in storage devices 134 and accessed by and/or collaborated over by one or more of the collaborators. A set of object metadata 154₁ associated with content object 152₁ might also be stored on or in storage devices 134.

The object metadata 154₁ describes certain attributes associated with content object 152₁, such as a name (e.g., file name), object identifier, version, file tree nodes, physical storage location, access permissions, and/or other attributes. The content management server 132 uses the object metadata 154₁ and/or other information to manage access and changes to content object 152₁ by the collaborators. Specifically, the content management server 132 has the capability of managing concurrent access to content object 152₁ by multiple collaborators and resolving editing and/or versioning conflicts that might arise from the concurrent access.

In many cases, such access to content object 152₁ by the collaborators is facilitated by a uniform resource locator (URL) that serves to identify and locate the content object 152₁. The URL of a particular content object might be included in the object metadata associated with the content object. In these cases, a particular collaborator will use the URL to access the content object 152₁ remotely stored at the collaboration system 130 in the cloud-based storage environment 140 from a respective local computing environment. As illustrated in FIG. 1, for example, a collaborator 112 might interact with a user device 102 in local computing environment 120 to access the content object 152₁ using a URL. As used herein, a local computing environment is a setting in which a user device can be operated outside of the boundaries of the collaboration system. One example includes a mobile device being operated in any geography that interacts with components of the collaboration system over a network. As another example, a local computing environment may include a laptop, or desktop, or deskside computer being operated in any geography that interacts with components of the collaboration system over a network.

As earlier mentioned, using a URL to access the content object 152₁ requires that user device 102 is online, which is not always feasible or efficient. In one use case, if collaborator 112 is offline or planning to be offline, the collaborator might desire to have a local instance of content object 152₁ at user device 102 that can be managed by the native capabilities of user device 102 and then synchronized with the remote instance of content object 152₁ at collaboration system 130 when back online. However, facilities for efficiently transitioning from a remote access model where remotely-stored content objects are accessed through a URL to a synchronized model where locally-stored documents are accessed through the native capabilities of a user's device are needed.

The herein disclosed techniques address such problems at least in part by implementing an instance of a local content management engine 110 at the respective user devices (e.g., user device 102) of the collaborators (e.g., collaborator 112) associated with collaboration system 130. In certain embodiments, the codebase (e.g., executable code) that constitutes the local content management engine 110 is provided at collaboration system 130 and delivered (e.g., downloaded) to each of the user devices. Once installed at user device 102, the local content management engine 110 facilitates a protocol between user device 102 and collaboration system 130 that automatically replicates a remotely-stored instance of a content object (e.g., content object 152₁) to a locally-stored and synchronized instance of a content object (e.g., content object 152₂).

One or more features of the local content management engine 110 can be enabled or disabled or otherwise configured by a user selection. Such a user selection can serve to enable or disable caching and/or can serve to enable or disable synchronization features, and/or can serve to establish configuration settings and/or preferences that relate a particular type of content object (e.g., by file type) to a particular application. For example, a user can establish a preference that a content object of type ".docx" would be opened by a word processing application. As another example, a user can establish a configuration setting or preference to specify that downloaded content is to be displayed in a browser. Alternatively, a user can establish another form of explicit specification that downloaded content is to be displayed in a non-browser application (e.g., in a native application or using a facility of a local content management engine).

To illustrate the foregoing protocol, FIG. 1 depicts a set of operations that commence with receiving a URL at user device 102 that refers to content object 152₁. The occurrence of the URL is intercepted before the browser acts on the URL (operation 1). The URL might be received by one or more native applications 106 at user device 102. For example, the URL might be received in a browser 104 (e.g., as a link in a web-based document access portal), an editor 105₁ (e.g., as a link in a Word document), a viewer 107 (e.g., as a link in an Acrobat Reader document), and/or another native application (e.g., email). In the shown embodiment, when the URL is used (e.g., clicked) a protocol between the user device 102 and the collaboration system 130 is invoked. The collaboration system 130 in turn may initiate a replication protocol (operation 2). For example, the URL might launch the browser 104 to issue an HTTP request to collaboration system 130. As another example, the URL might intercept the user action on the URL and process the URL by issuing an HTTP request to collaboration system 130 rather than having the browser issue the HTTP request. The collaboration system 130 responds to the request at least in part by delivering an instance of content object 152₁ and an instance of object metadata 154₁ to user device 102 (operation 3).

In some situations, however, the content object referenced in the URL might already be resident in the local storage or cache area of the user device 102 and, as such, the aforementioned replication protocol of operation 2 is not invoked. In some situations, such as when the content object referenced in the URL is already resident in storage of the user device 102, and the aforementioned replication protocol of operation 2 might be invoked to send only updated metadata corresponding to the content object that is already resident in storage of the user device 102. In yet other situations, such as when the content object referenced in the URL is not already resident in storage of the user device 102, the aforementioned replication protocol of operation 2 might be invoked to initially send only a preview image corresponding to the content object.

Due to a set of then-current conditions, and/or due to the then-current or earlier performance of any of the foregoing operations, and/or due to the performance of any prefetching of content (e.g., based on explicit or predicted prefetching operations), the content object and object metadata are received by local content management engine 110 and stored locally at user device 102 (operation 4). As such, at least one content object (e.g., content object 152₂) and its corresponding object metadata (e.g., object metadata $154_2$) are stored locally in at least one location at user device 102. In some cases, such as when the content object comprises one or more embedded content objects (e.g., a Word document with an embedded Excel workbook), a plurality of content objects and sets of object metadata might be delivered by collaboration system 130 for receipt by local content management engine 110 and then stored at user device 102.

In the embodiment shown in FIG. 1, the protocol further launches at least one native application to view and/or edit the content object $152_2$ (operation 5). In some cases, one or more respective native applications that serve for viewing and/or for editing and/or for otherwise operating over embedded content objects within the content object $152_2$ might also be launched. The native non-browser applications (e.g., editor $105_1$ and/or viewer 107) that are launched might be selected based at least in part on the file type of content object $152_2$ as specified in the environment variables of the operating system of user device 102. With content object $152_2$ locally available at user device 102, such manipulation by a native application can occur when user device 102 is online or offline. As such, the local instance of a content object (e.g., content object $152_2$) might be edited by collaborator 112 while user device 102 is offline, and the remote instance of the content object (e.g., content object $152_1$) and/or other locally-stored instances of the content object that might be stored at other user's devices might be concurrently edited by other collaborators. In this case, when user device 102 is back online, the local content management engine 110 facilitates a synchronization of the local and remote instances of the content object and/or corresponding object metadata (operation 6). In some cases, only the corresponding object metadata is synchronized. This can happen, for example, if the content object is viewed (e.g., in a manner that updates a "last access" timestamp) but the content object itself is not changed.

The aforementioned capabilities facilitated by the herein disclosed techniques result in improvements in computer functionality that serve to reduce the demand for computer processing power, reduce the demand for computer memory and data storage, reduce network bandwidth use, and reduce the demand for inter-component communication in computing environments. Specifically, applications of the herein disclosed techniques reduce the consumption of networking resources by facilitating interactions with instances of remotely-stored content objects at user devices that are offline. Furthermore, the consumption of computing resources at the user devices and/or collaboration systems that store the remotely-stored content objects is reduced by automatically (e.g., in response to a single URL click) transitioning shared content collaboration activities from a remote access model to a synchronized model.

One embodiment for carrying out web-to-local transitions (e.g., from a remote storage facility to a user device for local access) is disclosed in further detail as follows.

Figure 2:
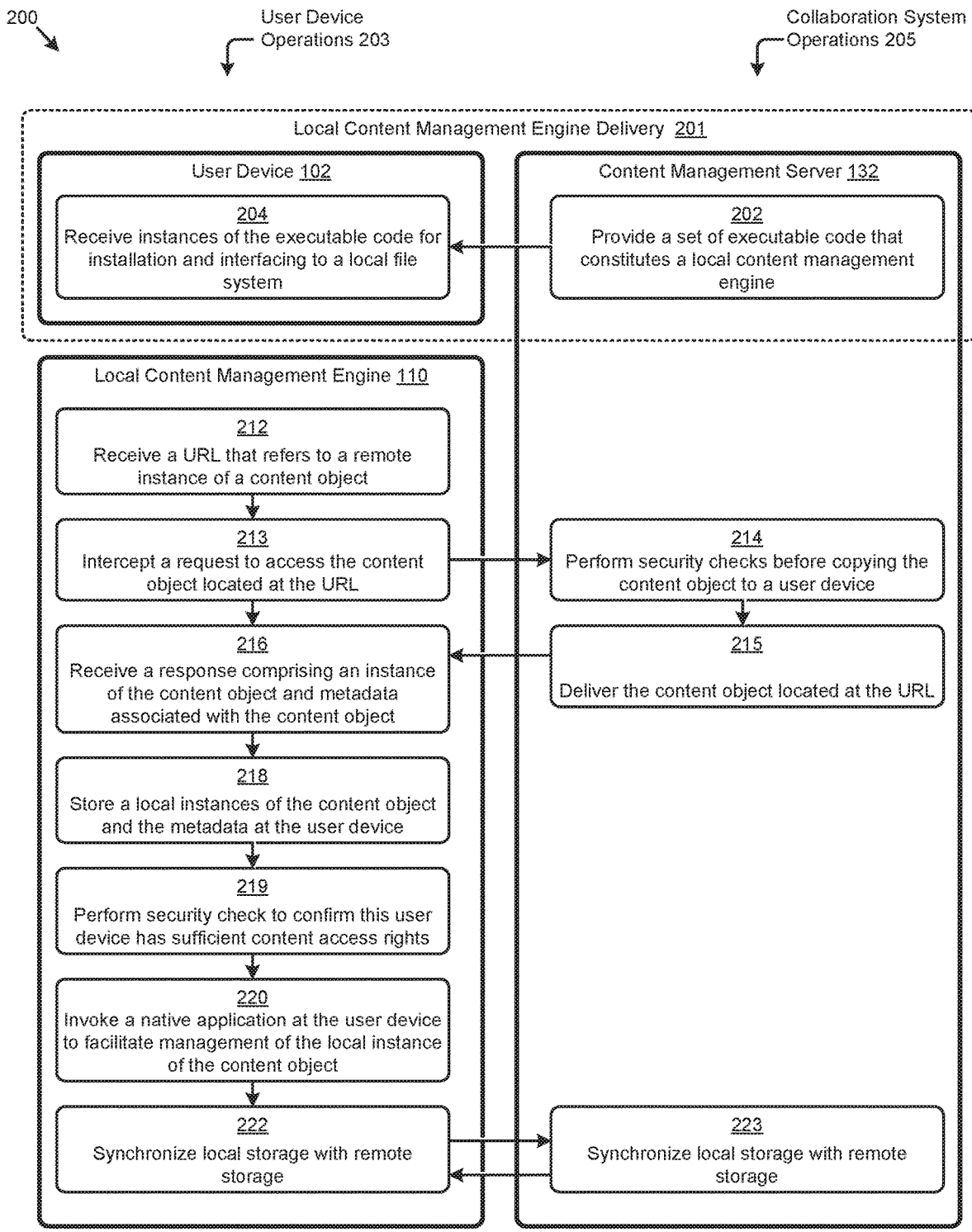
FIG. 2 depicts a web-to-local content object replication technique as implemented in systems that facilitate replication of remote content objects to a synchronized local computing environment, according to an embodiment.

FIG. 2 depicts a web-to-local content object replication technique 200 as implemented in systems that facilitate replication of remote content objects to a synchronized local computing environment. As an option, one or more variations of web-to-local content object replication technique 200 or any aspect thereof may be implemented in the context of the architecture and functionality of the embodiments described herein. The web-to-local content object replication technique 200 or any aspect thereof may be implemented in any environment.

FIG. 2 illustrates aspects pertaining to invoking a protocol to automatically replicate a remotely-stored instance of a content object to a locally-stored and synchronized instance of the content object. Specifically, the figure is presented to illustrate steps pertaining to local content management engine delivery 201, as well as to show how a set of user device operations 203 are carried out in conjunction with a set of collaboration system operations 205.

As shown, the web-to-local content object replication technique 200 commences by providing a set of executable code that constitutes (e.g., facilitates the capabilities of) a local content management engine as described herein (step 202). Instances of the executable code are delivered for installation at one or more user devices (step 204). For example, a user (e.g., collaborator) at user device 102 might take some action (e.g., click a "Download Now" button) at user device 102 to download an instance of the executable code from collaboration system 130 and install it as the local content management engine 110 on user device 102.

At some moment in time, a URL that refers to a remote instance of a content object might be received at a user device (step 212). For example, the URL might be received as a hyperlink in an email or a document (e.g., PDF document). The local content management engine 110 at the user device can detect and intercept any requests to the URL from the user device (step 213). The operations of step 213 may include determining if the user device has an operational installation of a synchronization manager (e.g., local content management engine) and, if so, the local storage and/or cache is checked to determine if the content object is already present at the user device. If so, then rather than issuing a request to the collaboration system 130 to replicate a corresponding remotely-stored content object to the user device, the local copy is used instead. In some cases, the determination as to whether or not the content object is locally stored can be done by querying the synchronization manager. In other cases, the determination as to whether or not the content object is locally stored can be done by accessing a directory in local storage 108. In example cases, a portion of the URL contains the name or other identifier of the content object. The name or identifier of the content object can be used in the aforementioned querying.

In many cases, the URL comprises information in addition to the name or identifier of the content object of interest. This information can be used to retrieve the content object in the event that the content object is not stored locally at the user device. As an example, the URL might be configured to issue a request to the collaboration system 130 to replicate a corresponding remotely-stored content object to the user device issuing the request. The collaboration system receives the request and performs security checks before copying the content object to a user device (e.g., checks for malware or checks to confirm that the user has access rights to download the content to a user device) (step 214).

In some situations, certain content is protected against downloading to user devices and/or against downloading to user devices that originate from certain internet protocol (IP) addresses or geographic locations. For example, a draft of a document that comprises highly sensitive information might be restricted (e.g., by security settings) from being downloaded to user devices, or such a document might be restricted from being downloaded to user devices that are deemed to be located in a foreign country or jurisdiction (e.g., based on characteristics of an IP address). In some embodiments, content is protected against being downloaded to user devices by checking for malware that is formed by or embedded into a content object. Any known technique can be used to do such malware checking. In some embodiments, the content management server 132 includes and/or interfaces to a "sandbox" that provides a separate execution environment within which tests for malware can be run, including execution of the content object and/or identified macros within the content object. In the event that malware is detected or suspected, the content object is restricted against further promulgation, including promulgation by being downloaded to user devices.

However, in the event that downloading to the user device is not restricted, then at step 215, the collaboration system carries out a protocol with the local content management engine 110 to replicate the remotely-stored content object to the user device that issued the request.

The local content management engine 110 receives an instance of the content object and object metadata associated with the content object (step 216). In some cases, both the content object and its metadata are sent to the local content management engine 110 in a single message. In other cases, the content object metadata is sent to the local content management engine 110 in a first message, followed by a second message or series of messages in which the content object is communicated from the collaboration system 130 to the local content management engine 110. In some situations, the content object is large and/or the communication channel bandwidth is limited and, thus, a relatively long time to download to the user's device might be needed. In such situations, the user might still want to see a folder listing with updated metadata and/or progress indications even while the download is being carried out. As such, delivery of content object metadata in advance of delivery of the content object itself serves for populating and/or animating portions of a user interface at the user device while the content object itself is in the process of being replicated.

Local instances of the content object and the object metadata are stored at the user device (step 218). The storage devices of the user device can be any sort of non-volatile or volatile storage. In some cases, a single user device may support multiple storage devices and/or multiple storage devices of different types. For example, a user device might include one or more hard disk drive devices as well as one or more solid state storage devices.

In some cases, still further security checks are performed (step 219). As one example of such security checks, the local content management engine 110 and/or its agents might perform a check to confirm that the user (an authenticated user) is authorized to operate on (e.g., edit, synchronize, etc.) the content object and/or its metadata using a particular native application. As another example, the local content management engine 110 and/or its agents might perform a check, possibly involving the content management server and/or its agents to confirm that the authenticated user that requested access to the content object (step 213) is the same authenticated user who is operating the local content management engine 110 at the user device, and/or is the same authenticated user who will use the invoked native application (step 220).

Certain environment variables and/or settings associated with the operating system and/or file system of the user device might be consulted by the local content management engine 110 to determine the appropriate native application to open. For example, the file associations that map default native applications to file extensions might be consulted to determine the native application to open for a particular type of content object. Changes to the local instances of the content object and/or object metadata are synchronized by the local content management engine 110 with the respective remote instances of the content object and/or object metadata (step 222 and step 223).

One embodiment of a system, data flows, and data structures for implementing the web-to-local content object replication technique 200 and/or other herein disclosed techniques is disclosed as follows.

Figure 3:
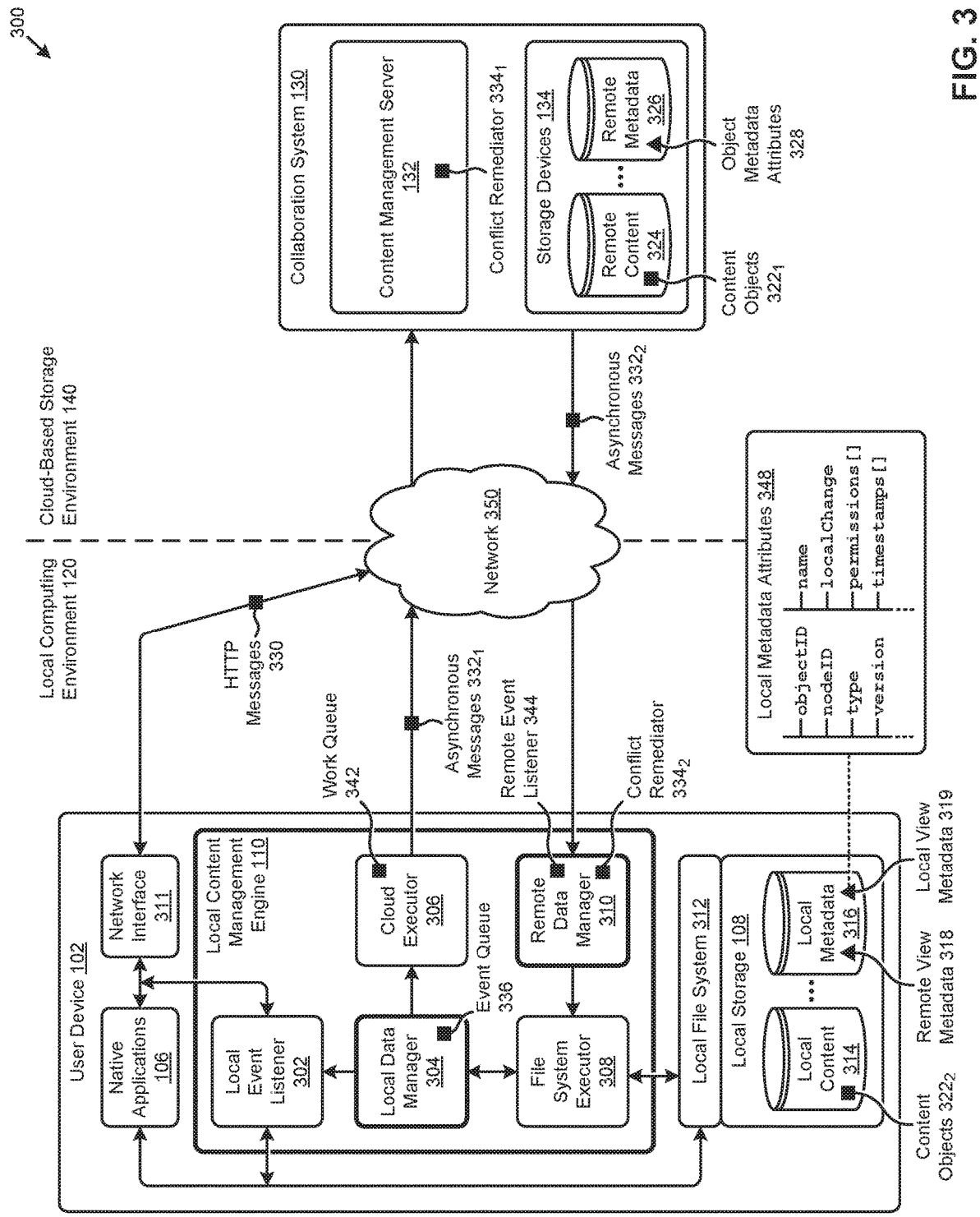
FIG. 3 presents a block diagram of a system that facilitates replication of remote content objects to a synchronized local computing environment, according to an embodiment.

FIG. 3 presents a block diagram of a system 300 that facilitates replication of remote content objects to a synchronized local computing environment. As an option, one or more variations of system 300 or any aspect thereof may be implemented in the context of the architecture and functionality of the embodiments described herein. The system 300 or any aspect thereof may be implemented in any environment.

FIG. 3 illustrates one aspect pertaining to invoking a protocol to automatically replicate a remotely-stored instance of a content object to a locally-stored and synchronized instance of the content object. Specifically, the figure is being presented to show one embodiment of certain representative components and associated data flows that describes how the herein disclosed techniques might be implemented in a computing environment that comprises a cloud-based storage environment 140 and one or more instances of a local computing environment 120. Also illustrated are various specialized data structures that improve the way a computer uses data in memory when performing steps pertaining to replication of remote content objects at cloud-based storage environment 140 to synchronized instances of the remote content objects at local computing environment 120. The components, data flows, and data structures shown in FIG. 3 present one partitioning and associated data manipulation approach. The specific example shown is purely exemplary, and other subsystems, data structures, and/or partitioning are reasonable.

As shown, system 300 comprises several components earlier described. Specifically shown are user device 102 in local computing environment 120 and collaboration system 130 in cloud-based storage environment 140. The user device 102 and local computing environment 120 represent a plurality of user devices and respective local computing environments that might be associated with a particular collaboration system and remote (e.g., cloud-based) storage environment. One or more native applications 106 at user device 102 interact with various instances of local content 314 stored in local storage 108 through a local file system 312. In the embodiment of FIG. 3, the local file system 312 is specific (e.g., native) to the operating system (OS) of user device 102.

For example, one of the native applications 106 might be Microsoft Word, which will interact with local file system 312 to open a document (e.g., with a .docx extension) from local content 314 and to save an edited version of the document. As another example, a browser (e.g., Microsoft Edge, Google Chrome, etc.) natively available at user device 102 might communicate directly with a network interface 311 to issue and/or receive HTTP messages 330 (e.g., HTTP requests, HTTP responses, etc.) over a network 350.

In accordance with the herein disclosed techniques, a local content management engine 110 is delivered by collaboration system 130 and installed on user device 102. As shown, installation of the local content management engine 110 might also allocate a certain portion of local storage 108 at user device 102 to a set of local metadata 316. The local metadata 316 can comprise sets of remote view metadata 318 and sets of local view metadata 319. As discussed in further detail herein, the remote view metadata 318 represents the last-known view (e.g., before going offline) of the metadata associated with one or more remotely-stored content objects, and the local view metadata 319 represents the then-current view of the metadata associated with local instances of the content objects. Any of the foregoing sets of metadata in local metadata 316 might be configured to comprise internal data structures for fast access. In some cases, such internal data structures can be protected (e.g., locked). Further, data structures for the local metadata 316 can hold a set of local metadata attributes 348 for each respective local instance of a content object.

As shown, the local metadata attributes 348 for each object accessible by the local file system 312 might include an object identifier uniquely identifying the remotely-stored content object in the cloud-based storage environment 140 (e.g., stored in an "object ID" field), a node identifier uniquely identifying a certain node in a file tree associated with the object (e.g., stored in a "node ID" field), a description of the node and/or content object type (e.g., stored in a "type" field), a description of the version of the content object from the perspective of the local computing environment 120 (e.g., stored in a "version" field), a name associated with the content object (e.g., stored in a "name" field), a bit setting indicating a local change (e.g., bit="1") that has yet to be confirmed at the cloud-based storage environment 140 (e.g., stored in a "localChange" bit), a set of access permissions (e.g., full access, view-only, unlocked, locked, etc.) for the content object (e.g., stored in a "permissions [ ]" object), one or more timestamps to indicate various file events (e.g., last accessed, last modified, created, etc.) associated with the content object (e.g., stored in a "timestamps [ ]" object), and/or other attributes.

In some cases, the "localChange" bit might indicate merely for a short time that a local change has occurred, as it can be cleared (e.g., bit="0") when confirmation that the change was committed remotely has been received by the local content management engine 110. Furthermore, the local metadata 316 can comprise attributes that are specific to the particular operating system of user device 102. Moreover, the structure and/or attributes associated with local metadata 316 might be established at compile time of the local content management engine 110 based at least in part on a target operating system. In case of a Mac OS, the local metadata attributes 348 might include certain extended attributes (e.g., stored in an "xattr [ ]" object), a user identifier (e.g., stored in a "UID" field), and/or a group identifier (e.g., stored in a "groupID" field). As such, local metadata attributes 348 can be configured to comport with any target operating system.

As shown in the cloud-based storage environment 140, a content management server 132 can represent the various computing devices that carry out the operations of a collaboration system 130 (e.g., cloud-based shared content storage platform). The content management server 132 can access the storage devices 134 that can comprise a set of remote content 324, a set of remote metadata 326, and/or other data to facilitate the cloud-based storage operations. As shown, the remote metadata 326 can comprise certain instances of object metadata attributes 328 associated with a set of remote instances of content objects $322_1$ remotely-stored in the cloud-based storage environment 140. For example, the object metadata attributes 328 might include certain attributes that characterize the location, version, access permissions, and/or other characteristics of a particular content object.

Furthermore, the remote content 324 can comprise the content objects $322_1$ that are automatically replicated to synchronized instances of the content objects to the various local computing environments (e.g., local computing environment 120) in accordance with the herein disclosed techniques. For example, a set of content objects $322_2$ locally-stored in local content 314 can represent the local instances of the content objects $322_1$ remotely-stored in remote content 324.

To facilitate such techniques described herein, the local content management engine 110 can implement a local event listener 302 to detect interactions between the native applications 106 and the local file system 312 and/or the network interface 311. As an example, the local event listener 302 might detect a request issued by a browser from the native applications 106 that pertains to a URL corresponding to a remotely-stored content object (e.g., from content objects $322_1$). In another case, the local event listener 302 might detect a detect a request from a native application to open a remotely-stored content object (e.g., from content objects $322_1$) that is codified (e.g., as a node in a file tree) in the local file system 312, but is not locally stored (e.g., in local content 314). The local event listener 302 interprets the detected interactions, which may be OS-specific interactions (e.g., OS-specific file system calls), to be dispatched to a local data manager 304 in a structure common (e.g., OS-agnostic) to the local content management engine 110.

In response to receiving the dispatched messages, the local data manager 304 issues one or more commands and/or calls to a file system executor 308 and/or a cloud executor 306. In some cases, received messages might be placed in an event queue 336 for later processing. The file system executor 308 processes commands from local data manager 304 that pertain to the local computing environment 120, while the cloud executor 306 processes commands from local data manager 304 that pertain to the cloud-based storage environment 140. Specifically, the file system executor 308 can process commands and/or calls associated with the local file system 312 and/or local storage 108, such as a change to the local metadata 316 and/or a change to the local content 314. For example, an edit to a portion (e.g., chunk) of a content object using a native application might invoke a call to the file system executor 308 to change various metadata attributes (e.g., version, size, last modified timestamp, etc.) in the local metadata 316 and/or change the portions of the local content 314 that correspond to the modified content object chunk. In some cases, such operations by the file system executor 308 are invoked synchronously in response to the originating file system interaction dispatched from the local event listener 302.

In comparison, the cloud executor 306 receives calls from the local data manager 304 into a work queue 342 for delivery to the content management server 132 over network 350. For example, the foregoing edit to the portion of the content object might also invoke a call to the cloud executor 306 to change various object metadata attributes (e.g., version, size, last modified timestamp, etc.) in the remote metadata 326 and/or change portions of the remote content 324 corresponding to the modified content object chunk. Such operations can be carried out in response to one or more asynchronous messages $332_1$ issued from the work queue 342 of the cloud executor 306. The content management server 132 can receive such asynchronous messages from any and all user devices of various collaborators.

In environments where collaborators work asynchronously on various shared content it is possible for conflicts to be raised. In the embodiment of FIG. 3, remediation of conflicts between content objects $322_2$ and content objects $322_1$ can be facilitated by a conflict remediator $334_1$ at content management server 132 and/or a conflict remediator $334_2$ at local content management engine 110. For example, if the conflict remediator $334_1$ at content management server 132 detects two conflicting operations to be applied over a single content object, conflict remediator $334_1$ will order the operations appropriately and apply version indicators as needed. If conflict remediator $334_2$ detects that a content object was edited both locally and remotely, conflict remediator $334_2$ would generate actions, messages and/or events to be performed in the local computing environment 120. In some cases, the remote conflict remediators and the local conflict remediator operate independently. In other cases, the conflict remediators might operate in a coordinated manner by communicating messages over network 350.

The conflict remediator $334_1$ at the content management server 132 can reconcile the information (e.g., versions, object changes, etc.) received from the local computing environment 120 to deliver (e.g., broadcast) the reconciled information to the various user devices of the relevant collaborators in a set of asynchronous messages $332_2$. For example, the asynchronous messages 3322 might include object metadata updates and/or content object updates to be recorded at the user devices by respective instances of the local content management engine. Instances of such asynchronous updates can be received locally by a remote event listener 344 of a remote data manager 310 operating at the local content management engine 110 of user device 102. The remote data manager 310 can schedule the received changes with the file system executor 308 to be applied to the local storage 108 through the local file system 312. This approach allows each collaborator to work asynchronously (e.g., independently) on various shared content, yet receive low latency (e.g., near real time) updates pertaining to operations performed by other collaborators in a respective instance of the local computing environment 120.

An embodiment of the local content management engine 110 discussed in FIG. 3 and herein is disclosed in detail as follows.

Figure 4:
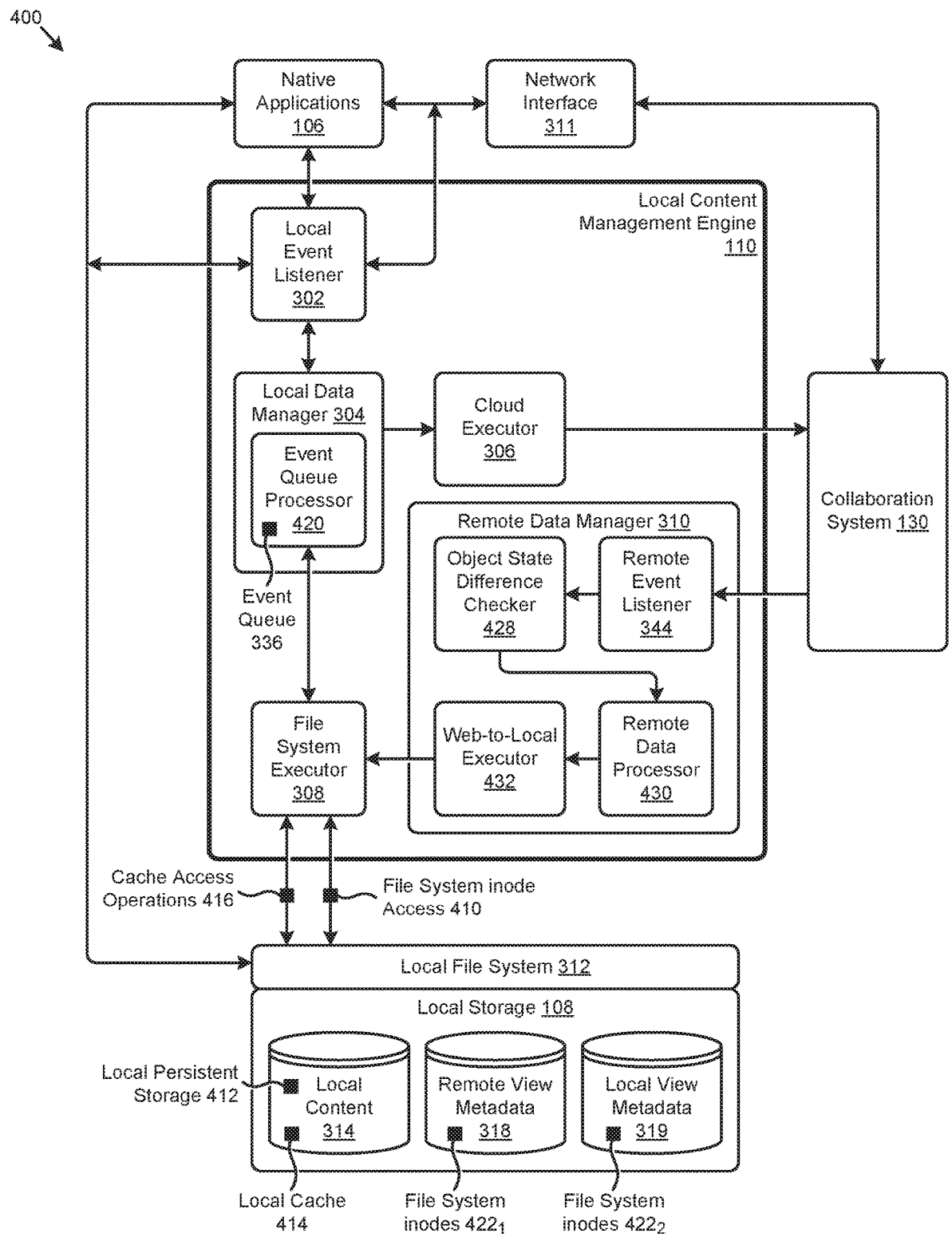
FIG. 4 is a block diagram showing a local content management engine implementation that facilitates replication of remote content objects to a synchronized local computing environment, according to an embodiment.

FIG. 4 is a block diagram showing a local content management engine implementation 400 that facilitates replication of remote content objects to a synchronized local computing environment. As an option, one or more variations of local content management engine implementation 400 or any aspect thereof may be implemented in the context of the architecture and functionality of the embodiments described herein. The local content management engine implementation 400 or any aspect thereof may be implemented in any environment.

FIG. 4 illustrates one aspect pertaining to invoking a protocol to automatically replicate a remotely-stored instance of a content object to a locally-stored and synchronized instance of the content object. Specifically, the figure is being presented to show one embodiment of certain representative components and associated data flows that describe how certain of the herein disclosed techniques might be implemented in a local content management engine. The components, data flows, and data structures shown in FIG. 4 present one partitioning and associated data manipulation approach. The specific example shown is purely exemplary, and other subsystems, data structures, and/or partitioning are reasonable.

As shown in the figure, an instance of local content management engine 110 is composed of a local event listener 302 that detects interactions between a set of native applications 106 and a local file system 312 and/or a network interface 311. As an example, consider a certain request issued by one of the native applications 106 to access a file managed by the local file system 312. In such a case, the request can be detected by the local event listener 302 for processing by local content management engine 110. More specifically, consider a request that pertains to (a) a write to update the contents of a file and (b) a rename of the file. In this case, the request can be dispatched by local event listener 302 to a local data manager 304 to carry out various operations associated with the request. Specifically, the local data manager 304 can be considered the component of the local content management engine 110 that receives file access event information to perform operations associated with the file access events.

In some cases, the local data manager 304 can manage two processing paths for certain detected events. For example, in a first path, the local data manager 304 can modify locally maintained content and/or metadata in response to the event. In a second path, the local data manager 304 can coordinate the performance of operations that might need to be made at a collaboration system 130.

With regard to local processing, a file system executor 308 can perform any number or variations of cache access operations 416 to, for example, save a copy of a modified file in a set of local content 314 in local storage 108. Certain portions of local content 314 might be persistently stored in a set of local persistent storage 412 (e.g., on a solid-state drive or hard disk drive). Other portions of local content 314 might be stored in a local cache 414. The local cache 414, for example, might comprise one or more partitions of the local memory of a local user device. As such, the local cache 414 can permit faster access to recently and/or frequently accessed content objects (e.g., files) to reduce the frequency of retrieving such objects from local persistent storage 412.

In some cases, merely portions (e.g., chunks) of a content object rather than the entire content object might be stored in the local cache 414 and/or other local storage facilities. This situation can arise, for example, when a collaborator is part of an enterprise that owns large volumes of shared enterprise content that the collaborator might need to access. In such cases, the user device of the collaborator might only be able to store a small portion of the shared enterprise content. As such, the herein disclosed techniques can facilitate delivery of local instances in chunks of the content object that are necessary to permit local viewing and/or editing of a local instance of the content object by the collaborator.

Further details regarding general approaches to chunk-based shared content object operations are described in U.S. patent application Ser. No. 15/140,179 titled "VIRTUAL FILE SYSTEM FOR CLOUD-BASED SHARED CONTENT", filed Apr. 27, 2016, which is hereby incorporated by reference in its entirety.

Certain types of content object changes may need to be reflected in the object metadata that are associated with the content objects (e.g., files). Such changes pertain to, for example, operations that delete, rename, or move any of the content objects in local content 314 that are managed by local content management engine 110. In such cases, various instances of a file system inode access 410 can be performed by file system executor 308 to, for example, apply changes to certain file system nodes (e.g., inodes).

In certain embodiments, two sets of metadata can be maintained by local content management engine 110. As an example, a set of local view metadata 319 can correspond to metadata that might be changed locally without confirmation of those changes from the collaboration system 130. Also, a set of remote view metadata 318 can correspond to metadata that hold the most recent snapshot of information from the point of view of the collaboration system 130. Respective instances of the aforementioned file system inodes (e.g., file system inodes 422₁ and file system inodes 422₂) can be recorded at the two sets of metadata and managed by the file system executor 308.

When any access to the local content 314 is detected by local content management engine 110, the remote view metadata 318 is first checked to determine the state of the relevant content objects from the perspective of the collaboration system 130. The local view metadata 319 is then used to reveal the locally-understood "delta" from the perspective of the collaboration system 130. In some cases, such deltas or lack of deltas can be used to ensure that any local content (e.g., content in local persistent storage 412 and/or content in local cache 414) reflects certain past actions that might have previously affected the subject content objects being accessed.

Further details regarding general approaches to caching of content in local persistent storage are described in U.S. Publication No. 2016-0321288 A1, which is hereby incorporated by reference in its entirety.

In the earlier mentioned write and rename operations, a request can be received to rename a file managed by the local content management engine 110. In such cases, a file system inode access 410 can be performed by file system executor 308 to apply the requested change (e.g., rename) immediately to the local view metadata 319. Such an approach can allow the local user device to continue to operate based on the locally-made change even though the change might not have been made throughout the collaborative environment (e.g., at the collaboration system 130, or at any other user devices that can access the subject file using a respective local instance of the local content management engine).

With regard to local file system changes, the local data manager 304 can place operations pertaining to file access events into an event queue 336 to be handled by an event queue processor 420. In some situations, the local data manager 304 might generate an event (e.g., "file A was renamed to file B"). This event might be broadcast or otherwise emitted through a messaging system that provides READ and WRITE access to events (e.g., in event queue 336). Such a messaging system and temporary persistence of events allows for other applications (e.g., a syncing engine, a logging tool, UI component, etc.) to listen for file access events and then to use them to initiate file-related operations. For example, a UI component may receive a "file renamed" event and respond by raising a notification for consideration by the collaborator. Such an event might also be logged.

With regard to remote processing, the local data manager 304 can also place certain file access events into an event queue 336 to be handled by any instance of an event queue processor 420. The event queue processor 420 can access the event queue 336 and can, for example, schedule certain calls to commit changes pertaining to a file write and/or a file rename to the collaboration system 130. In some cases, such commits and/or other operations can be implemented by calling a cloud executor 306. The calls to cloud executor 306 may comprise a remote storage application programming interface (API) call that specifies the object identifier for the file that is recognized by the collaboration system 130, and/or an API call that implements the change (e.g., rename, upload, upload version, delete, etc.).

In some embodiments, within the collaboration system 130, an API layer can receive the API calls from the cloud executor 306 to operate on the content objects and/or metadata at the collaboration system 130. For example, a mapping table (e.g., in a set of object metadata) may exist at the collaboration system 130 to map object identifiers to filenames. In this case, for example, a rename operation might result in changes to the entry for the subject content object(s) in the mapping table. Such changes may further result in an entry being placed in an action log that is exposed for listening.

Specifically, at a user device, a remote event listener 344 at a remote data manager 310 can listen for remote events pertaining to the user device. For example, the remote event listener 344 might listen for events pertaining to any content objects managed by local content management engine 110. Specifically, in the foregoing example, the rename operation committed at the collaboration system 130 pertains to the local user device associated with local content management engine 110 such that remote event listener 344 receives the event.

For such received event information, an object state difference checker 428 can review the event information associated with the event to determine how the event information relates to and/or differs from the local view of the subject content objects (e.g., files) corresponding to the event. In some cases, based on the type and/or extent of the differences identified by the object state difference checker 428, a remote data processor 430 and/or a web-to-local executor 432 can execute certain data operations locally at the user device. For example, the rename operation committed at collaboration system 130 can result in a change to the remote view metadata 318 to reflect certain file tree changes corresponding to the renaming of the file. With the remote view metadata 318 now reflecting this change, the local view metadata 319 can be modified to remove the pending status of the change.

In some cases, local content 314 may also be updated based on a received event. For example, if the received event pertains to a change made to a subject content object at another user device (e.g., by another collaborator), a locally-stored instance of the subject content object might be invalidated in advance of being replaced by an updated version. As another example, a received event at a given user device (e.g., an event that pertains to a detected content object change) might not require an update to, and/or might not require an invalidation of a locally-stored instance of the content object.

The foregoing discussions include approaches for invoking and carrying out a protocol to implement the herein disclosed techniques. The protocol can be invoked in many environments and/or the protocol can be carried out to accommodate many use models and/or scenarios, some of which are disclosed in further detail as follows.

Figure 5A:
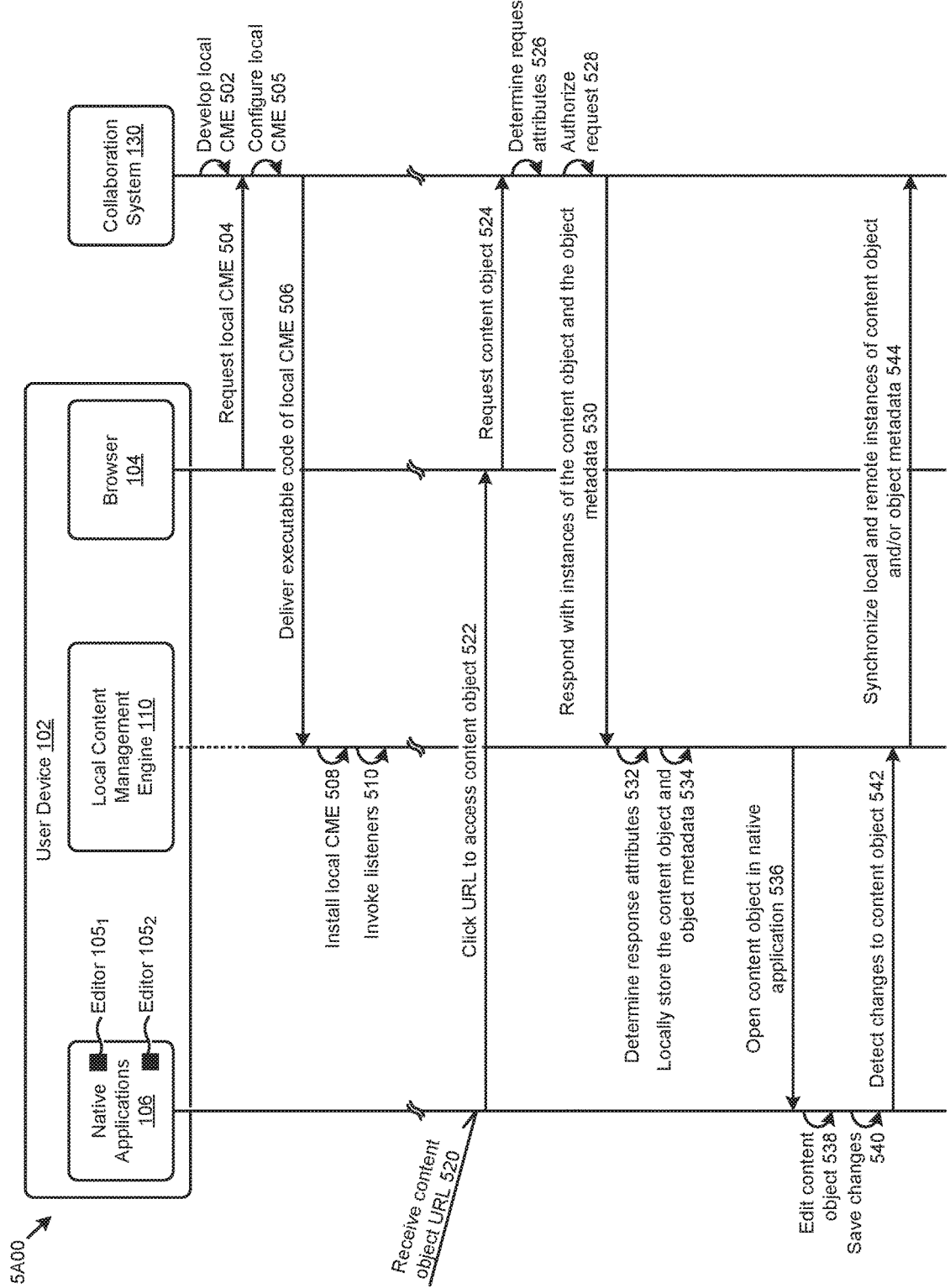
FIG. 5A is a diagram showing a web-to-local content object replication scenario for replication of remote content objects to a synchronized local computing environment, according to an embodiment.

FIG. 5A is a diagram showing a web-to-local content object replication scenario 5A00 for replication of remote content objects to a synchronized local computing environment. As an option, one or more variations of web-to-local content object replication scenario 5A00 or any aspect thereof may be implemented in the context of the architecture and functionality of the embodiments described herein. The web-to-local content object replication scenario 5A00 or any aspect thereof may be implemented in any environment.

FIG. 5A illustrates one aspect pertaining to invoking a protocol to automatically replicate a remotely-stored instance of a content object to a locally-stored and synchronized instance of that content object. Specifically, the figure is being presented to illustrate a representative web-to-local content replication scenario carried out over various computing components earlier described and facilitated by the herein disclosed techniques. The high order interactions (e.g., operations, messages, etc.) exhibited by the computing components in part comprise one embodiment of the aforementioned protocol. The particular computing components shown in FIG. 5A are the browser 104, the native applications 106, and the local content management engine 110 associated with user device 102, and the collaboration system 130.

The web-to-local content object replication scenario 5A00 can commence with a set of executable code that constitutes a local content management engine (CME) as described herein being developed at collaboration system 130 (operation 502). Responsive to a request for the local CME from user device 102 (message 504), an instance of the executable code of the local CME is configured (operation 505) and delivered to the user device 102 (message 506). For example, a collaborator associated with user device 102 might access an instance of browser 104 to request a download of the local CME. Upon installation of the local CME at user device 102 (operation 508), any listeners (e.g., local event listener, remote event listener, etc.) associated the instantiation of the local CME (e.g., local content management engine 110) are invoked (operation 510).

When configuring an instance of a local CME for download to a user device, the configuration steps may consider that one particular user device may have different characteristics from another particular user device. For example, one user device might be running the "iOS" operating system. Another user device might be running "Android". Based on characteristics of the user device and/or user preferences, a set of capabilities and preferences can be determined. Such user device characteristics are observed when configuring the CME, such that the local CME is configured so as to honor any particular device characteristics and/or user preferences pertaining to the user's device.

In some cases, a user device might support many browser capabilities. More particularly, a user device might support alternative browser-related user interface components and respective browser-related user interface capabilities. Strictly as example embodiments, a user device might support a markup language rendering component (e.g., an HTML renderer), and/or a user device might support an embedded browser that forms a portion of the operating system of the user device, and/or a user device might support an embedded browser extension that extends the operating system of the user device, and/or a user device might support access to a native web browser.

In some cases, the aforementioned preferences are based partially on the capabilities of the user device, including any software installed on the user device. Preferences can also be based on available user interface models. For example, user experiences that use compiled-in user interface capabilities are sometimes preferred over user experiences that introduce "app flipping". As such, the more preferred user interface technology is selected whenever possible.

For example, in some situations, a user device might support a markup language rendering component that includes an HTML renderer so as to provide the capability to view web content (e.g., HTML, CSS, JavaScript, etc.). Often, the user experience offered by a markup language rendering component delivered as compiled-in code is preferred over other possibilities. However, in some situations a markup language rendering component might not be available on the user device or might not deliver all of the functionality needed. In such cases, alternative browser embodiments are considered.

In any of the foregoing cases of download and installation, the user device will be configured to be able to respond to a click on a URL. As such, at some moment in time after installation of the CME, a content object URL is received at one or more of the native applications 106 at user device 102 (event 520). Clicking the URL to access the content object (message 522) launches the browser 104 to issue a request for the content object to collaboration system 130 (message 524). The browser 104 might present a message at user device 102 indicating that a request has been sent to the collaboration system for the content object. In certain circumstances, the message at user device 102 might indicate that a series of security checks have all passed or, if not, some indication of reasons and/or remediation in the event that not all of the series of security checks have passed.

At operation 526, various attributes associated with the request received at the collaboration system 130 are determined. For example, the request might specify an object identifier, a user identifier, and device identifier associated with the requestor and/or other attributes. If the request is authorized (e.g., based at least in part on the user identifier and/or device identifier) (operation 528), a response is issued by collaboration system 130 and received by local content management engine 110 that comprises instances of the content object and object metadata associated with the content object (message 530). As earlier mentioned, when the content object comprises one or more embedded content objects (e.g., a Word document with an embedded Excel workbook), a plurality of content objects and sets of object metadata might be identified and delivered in the response by collaboration system 130.

Various attributes associated with the response received at the local content management engine 110 are determined (operation 532). For example, the response might contain a payload of one or more content objects as well as corresponding sets of object metadata, and a response might further comprise certain instructions (e.g., scripts) to perform over the content objects (e.g., instructions to initiate viewing in a native application). Furthermore, the object metadata can comprise such information as the object identifiers, file tree (e.g., path) node identifiers, access permissions, and/or other attributes as used at the collaboration system 130. The content object or objects and corresponding metadata are then stored locally at user device 102 (operation 534). In some cases, it can happen that not all of a series of security checks have passed (e.g., there remain some unresolved security restrictions). In such cases, further operations by the local content management engine 110 are aborted, and the browser that originated the request (message 522) may process the downloaded content object based on its security profiles. However, in the event that the series of security checks have indeed passed, then one or more native applications are launched.

More specifically, and as earlier mentioned, the response received at local content management engine 110 might contain instructions to launch a native application to manage (e.g., view, edit, etc.) the newly replicated content object (message 536). However, in some cases, a choice of more than one native application is presented to the user. In some cases, more than one instance of a native application is launched to view and/or edit any embedded content objects within a subject content object. In some cases, two or more different native applications are launched to be able to view and/or edit both the subject content object as well as any embedded content objects within the subject content object.

In example embodiments, the operating system of the user device maintains a registry that relates a particular content object type (e.g., based on a filename extension) to a particular preferred native application. For example, an object that is a file with a filename extension of ".docx"

might be associated with a word processing application, or a file with a filename extension of ".mov" might be associated with a movie viewing application.

In the shown example of FIG. 5A, a first editor (e.g., editor 105₁) from the native applications 106 is invoked to open a first content object. In the case where the URL refers to a resource that comprises multiple content objects and/or where the URL refers to a first document of a first type that includes an embedded content object of a second type, it can happen that a second editor of a second type (e.g., editor 105₂) is invoked to open the embedded content object.

One or more of the aforementioned editors and/or any local application or any other application (e.g., a non-browser native application or a downloadable non-browser application) that has an editing mode can be used to edit the local instance of the content object (operation 538) and save the changes to the local storage of user device 102 (operation 540). According to the herein disclosed techniques, local content management engine 110 can detect such changes to the content objects (message 542) and interact with collaboration system 130 to synchronize the local and remote instances of the content object and/or the object metadata (message 544).

Figure 5B:
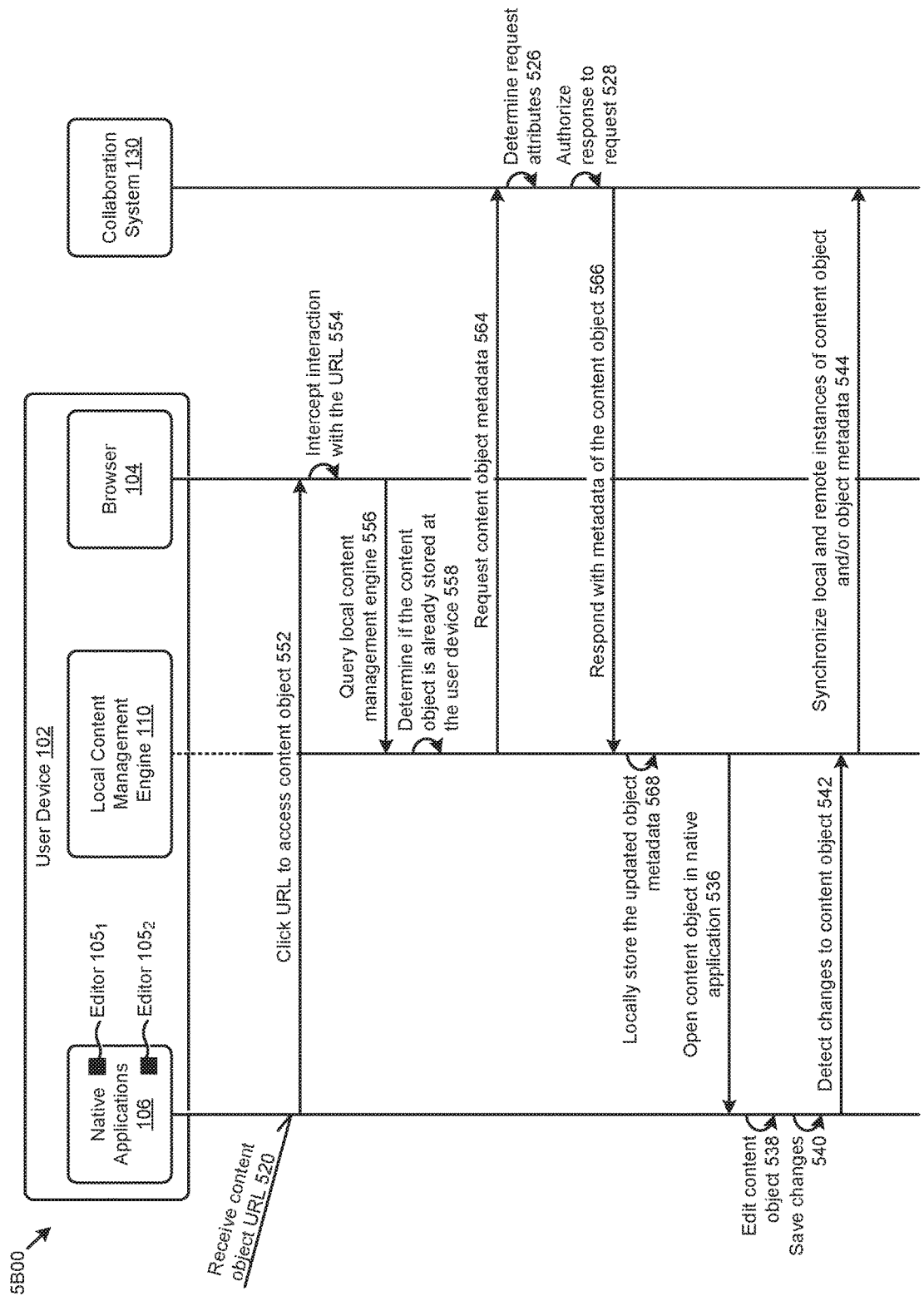
FIG. 5B is a diagram showing another web-to-local content object replication scenario for replication of remote content objects to a synchronized local computing environment, according to an embodiment.

FIG. 5B is another diagram showing a web-to-local content object replication scenario 5B00 for replication of remote content objects to a synchronized local computing environment. As an option, one or more variations of web-to-local content object replication scenario 5B00 or any aspect thereof may be implemented in the context of the architecture and functionality of the embodiments described herein. The web-to-local content object replication scenario 5B00 or any aspect thereof may be implemented in any environment.

The figure is being presented to show how a "click" or other interaction over a URL (e.g., event 520) can be intercepted at the user device and preprocessed before accessing the resource identified by the URL. In this specific embodiment, the browser 104 or another agent is configured to detect a click on a URL and intercept that event before accessing the resource of the URL. In the case of detection and interception of a click by an agent other than the browser, the agent is configured to interact with the operating system of the user device. In the shown case of detection and interception of a click by a browser, the browser may be configured with a browser plug-in that receives the occurrence of the click (message 552).

Upon interception of interaction with the URL (operation 554), the local content management engine 110 is queried (message 556). Processing of such a query results in a determination as to whether or not the object referred to in the link is present in local storage of the user device (operation 558). If so, then the local content management engine 110 does not request the content object from the collaboration system. Instead, the might merely request content object metadata from the local content management engine 110. This is shown by message 564, which, upon receipt at the collaboration system, components of the collaboration system initiate operations to process the request attributes (operation 526), authorize a response to the request (operation 528), and respond with updated metadata of the content object (e.g., message 566). As depicted in this particular embodiment, the collaboration system sends only the updated metadata of the content object rather than the content object itself.

The local content management engine stores the updated metadata (operation 568) at the user device, then proceeds (based on message 536) to open the content object in one or more of the native applications. The user can then edit the content object (operation 538) before saving the changes locally (operation 540), upon which event a listener detects changes to the content object (operation 542), which in turn causes synchronization of the local and remote instances of the content object and/or its metadata (e.g., message 544 is emitted and received at the collaboration system).

Additional Embodiments of the Disclosure

Additional Practical Application Examples

Figure 6A:
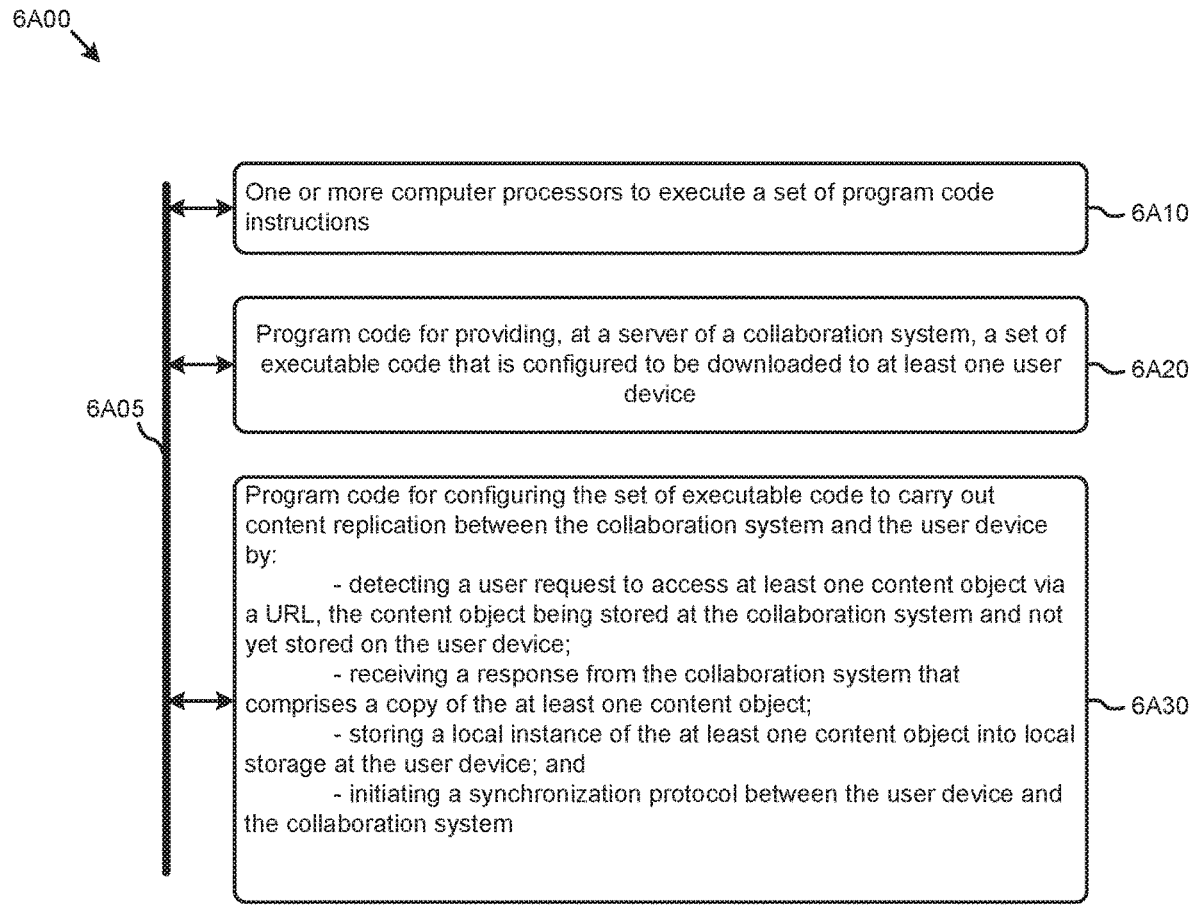
FIG. 6A and FIG. 6B depict system components as arrangements of computing modules that are interconnected so as to implement certain of the herein-disclosed embodiments.

FIG. 6A depicts a system 6A00 as an arrangement of computing modules that are interconnected so as to operate cooperatively to implement certain of the herein-disclosed embodiments. This and other embodiments present particular arrangements of elements that, individually and/or as combined, serve to form improved technological processes that address seamlessly mixing a URL-based content object sharing model with a locally-stored and synchronized content object sharing model. The partitioning of system 6A00 is merely illustrative and other partitions are possible. As an option, the system 6A00 may be implemented in the context of the architecture and functionality of the embodiments described herein. Of course, however, the system 6A00 or any operation therein may be carried out in any desired environment.

The system 6A00 comprises at least one processor and at least one memory, the memory serving to store program instructions corresponding to the operations of the system. As shown, an operation can be implemented in whole or in part using program instructions accessible by a module. The modules are connected to a communication path 6A05, and any operation can communicate with any other operations over communication path 6A05. The modules of the system can, individually or in combination, perform method operations within system 6A00. Any operations performed within system 6A00 may be performed in any order unless as may be specified in the claims.

The shown embodiment implements a portion of a computer system, presented as system 6A00, comprising one or more computer processors to execute a set of program code instructions (module 6A10) and modules for accessing memory to hold program code instructions to perform: providing, at a server of a collaboration system, a set of executable code that is configured to be downloaded to at least one user device (module 6A20); and configuring the set of executable code to carry out content replication between the collaboration system and the user device by: detecting a user request to access at least one content object via a URL, the content object being stored at the collaboration system and not yet stored on the user device; receiving a response from the collaboration system that comprises a copy of the at least one content object; storing a local instance of the at least one content object into local storage at the user device; and initiating a synchronization protocol between the user device and the collaboration system (module 6A30).

Variations of the foregoing may include more or fewer of the shown modules. Certain variations may perform more or fewer (or different) steps and/or certain variations may use data elements in more or in fewer (or different) operations. Still further, some embodiments include variations in the operations performed, and some embodiments include variations of aspects of the data elements used in the operations.

Figure 6B:
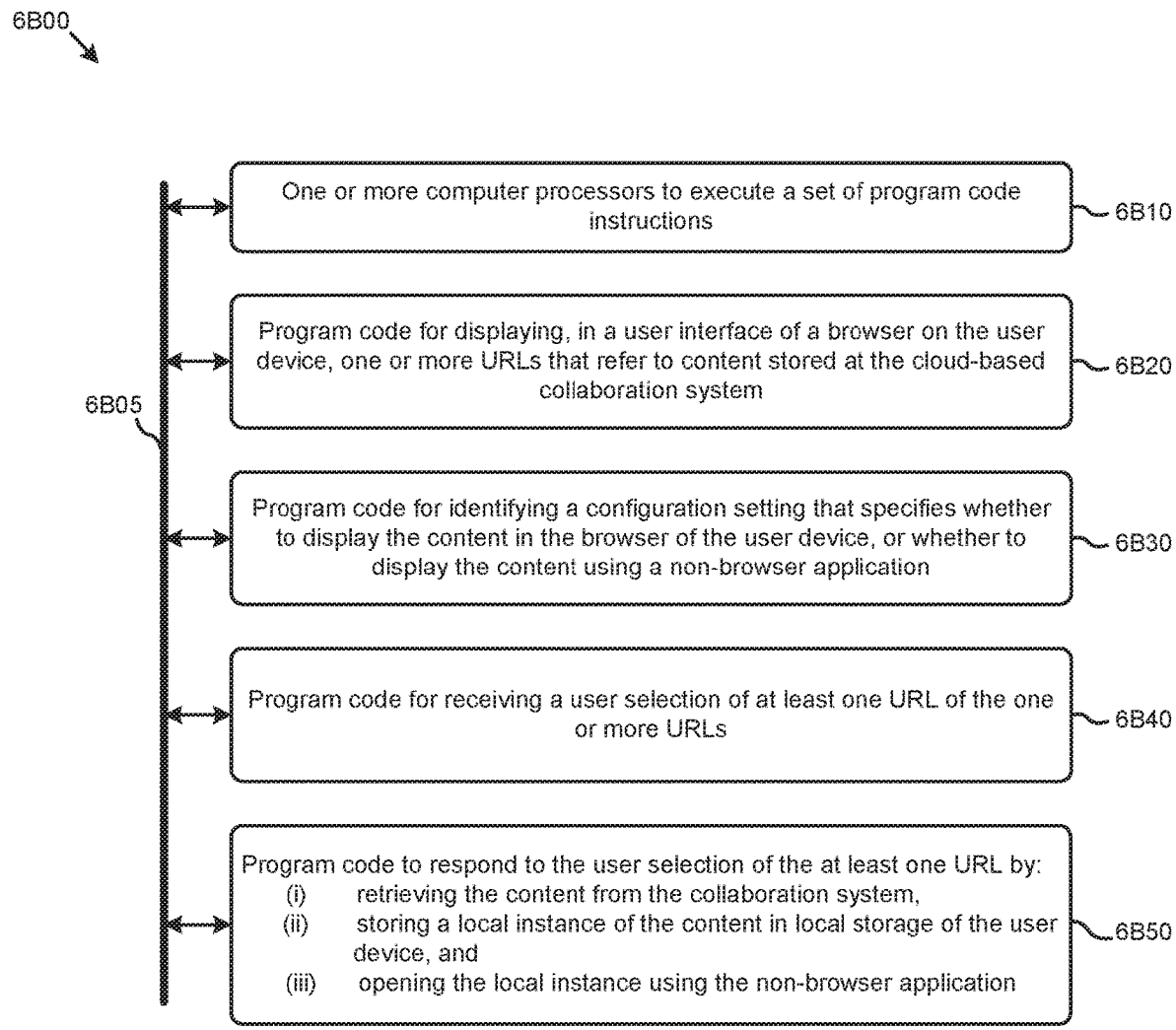

FIG. 6B depicts a system 6B00 as an arrangement of computing modules that are interconnected so as to operate cooperatively to implement certain of the herein-disclosed embodiments. The partitioning of system 6B00 is merely illustrative and other partitions are possible. As an option, the system 6B00 may be implemented in the context of the architecture and functionality of the embodiments described herein. Of course, however, the system 6B00 or any operation therein may be carried out in any desired environment.

The system 6B00 comprises at least one processor and at least one memory, the memory serving to store program instructions corresponding to the operations of the system. As shown, an operation can be implemented in whole or in part using program instructions accessible by a module. The modules are connected to a communication path 6B05, and any operation can communicate with any other operations over communication path 6B05. The modules of the system can, individually or in combination, perform method operations within system 6B00. Any operations performed within system 6B00 may be performed in any order unless as may be specified in the claims.

The shown embodiment implements a portion of a computer system, presented as system 6B00, comprising one or more computer processors to execute a set of program code instructions (module 6B10) and modules for accessing memory to hold program code instructions to perform: displaying, in a user interface of a browser on the user device, one or more URLs that refer to content stored at the cloud-based collaboration system (module 6B20); identifying a configuration setting that specifies whether to display the content in the browser of the user device, or whether to display the content using a non-browser application (module 6B30); receiving a user selection of at least one URL of the one or more URLs (module 6B40); responsive to the user selection of the at least one URL, displaying at least a portion of the content using the non-browser application by: (i) retrieving the content from the collaboration system, (ii) storing a local instance of the content in local storage of the user device, and (iii) opening the local instance using the non-browser application (module 6B50).

System Architecture Overview

Additional System Architecture Examples

Figure 7A:
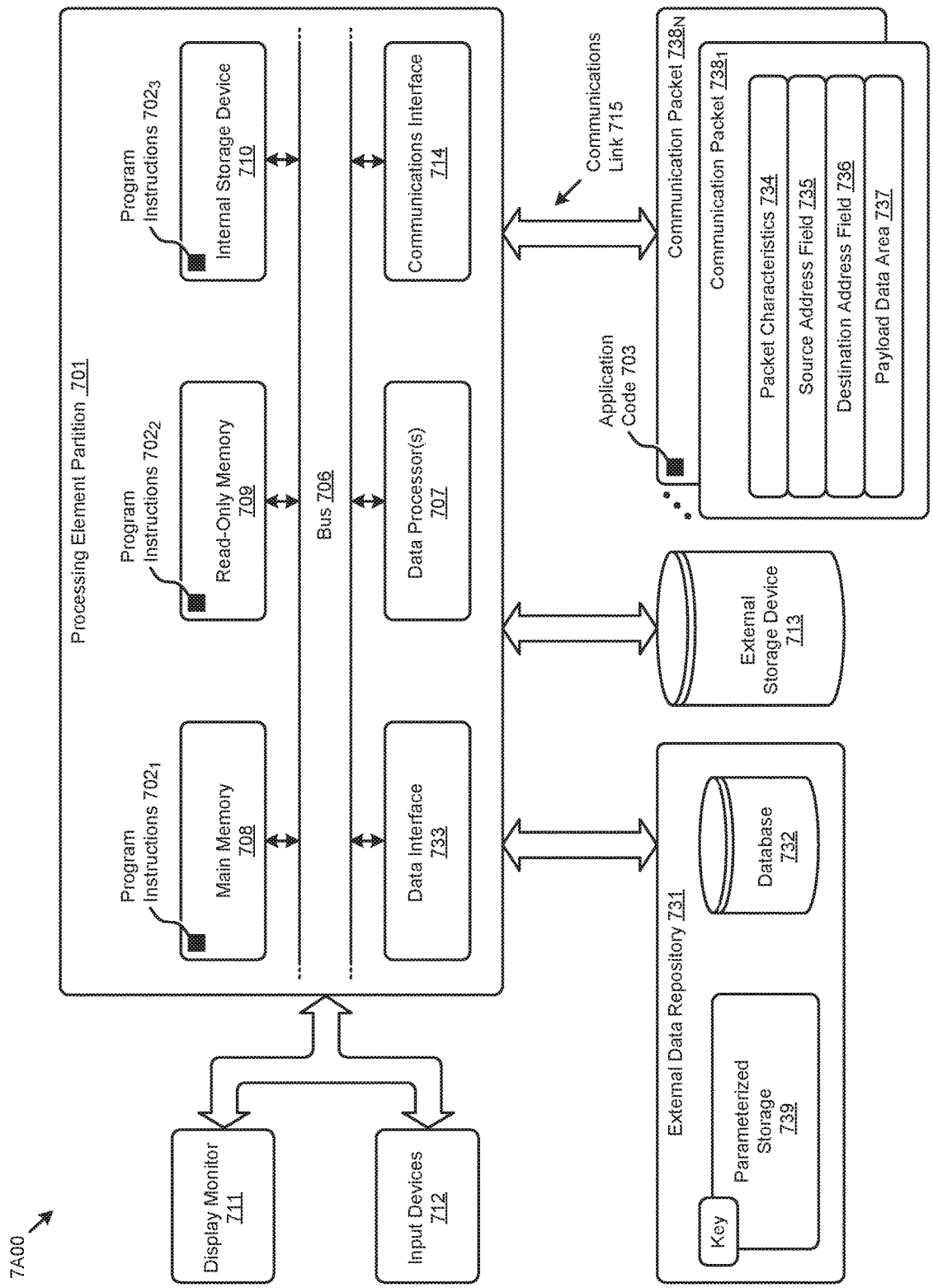
FIG. 7A and FIG. 7B present block diagrams of computer system architectures having components suitable for implementing embodiments of the present disclosure, and/or for use in the herein-described environments.

FIG. 7A depicts a block diagram of an instance of a computer system 7A00 suitable for implementing embodiments of the present disclosure. Computer system 7A00 includes a bus 706 or other communication mechanism for communicating information. The bus interconnects subsystems and devices such as a central processing unit (CPU), or a multi-core CPU (e.g., data processor 707), a system memory (e.g., main memory 708, or an area of random access memory (RAM)), a non-volatile storage device or non-volatile storage area (e.g., read-only memory 709), an internal storage device 710 or external storage device 713 (e.g., magnetic or optical), a data interface 733, a communications interface 714 (e.g., PHY, MAC, Ethernet interface, modem, etc.). The aforementioned components are shown within processing element partition 701, however other partitions are possible. Computer system 7A00 further comprises a display 711 (e.g., CRT or LCD), various input devices 712 (e.g., keyboard, cursor control), and an external data repository 731.

According to an embodiment of the disclosure, computer system 7A00 performs specific operations by data processor 707 executing one or more sequences of one or more program code instructions contained in a memory. Such instructions (e.g., program instructions 7021, program instructions 7022, program instructions 7023, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 7A00 performs specific networking operations using one or more instances of communications interface 714. Instances of communications interface 714 may comprise one or more networking ports that are configurable (e.g., pertaining to speed, protocol, physical layer characteristics, media access characteristics, etc.) and any particular instance of communications interface 714 or port thereto can be configured differently from any other particular instance. Portions of a communication protocol can be carried out in whole or in part by any instance of communications interface 714, and data (e.g., packets, data structures, bit fields, etc.) can be positioned in storage locations within communications interface 714, or within system memory, and such data can be accessed (e.g., using random access addressing, or using direct memory access DMA, etc.) by devices such as data processor 707.

Communications link 715 can be configured to transmit (e.g., send, receive, signal, etc.) any types of communications packets (e.g., communication packet $738_1$, communication packet $738_N$) comprising any organization of data items. The data items can comprise a payload data area 737, a destination address 736 (e.g., a destination IP address), a source address 735 (e.g., a source IP address), and can include various encodings or formatting of bit fields to populate packet characteristics 734. In some cases, the packet characteristics include a version identifier, a packet or payload length, a traffic class, a flow label, etc. In some cases, payload data area 737 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 707 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 731, which in turn can be formatted into any one or more storage areas, and which can comprise parameterized storage 739 accessible by a key (e.g., filename, table name, block address, offset address, etc.).

Execution of the sequences of instructions to practice certain embodiments of the disclosure are performed by a single instance of a computer system 7A00. According to certain embodiments of the disclosure, two or more instances of computer system 7A00 coupled by a communications link 715 (e.g., LAN, public switched telephone network, or wireless network) may perform the sequence of instructions required to practice embodiments of the disclosure using two or more instances of components of computer system 7A00.

Computer system 7A00 may transmit and receive messages such as data and/or instructions organized into a data structure (e.g., communications packets). The data structure can include program instructions (e.g., application code 703), communicated through communications link 715 and communications interface 714. Received program code may be executed by data processor 707 as it is received and/or stored in the shown storage device or in or upon any other non-volatile storage for later execution. Computer system 7A00 may communicate through a data interface 733 to a database 732 on an external data repository 731. Data items in a database can be accessed using a primary key (e.g., a relational database primary key).

Processing element partition 701 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 707. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to replication of remote content objects to a synchronized local computing environment. A module may include one or more state machines and/or combinational logic used to implement or facilitate the operational and/or performance characteristics pertaining to replication of remote content objects to a synchronized local computing environment.

Various implementations of database 732 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of replication of remote content objects to a synchronized local computing environment). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to replication of remote content objects to a synchronized local computing environment, and/or for improving the way data is manipulated when performing computerized operations pertaining to invoking a protocol to automatically replicate a remotely-stored instance of a content object to a locally-stored and synchronized instance of the content object.

Figure 7B:
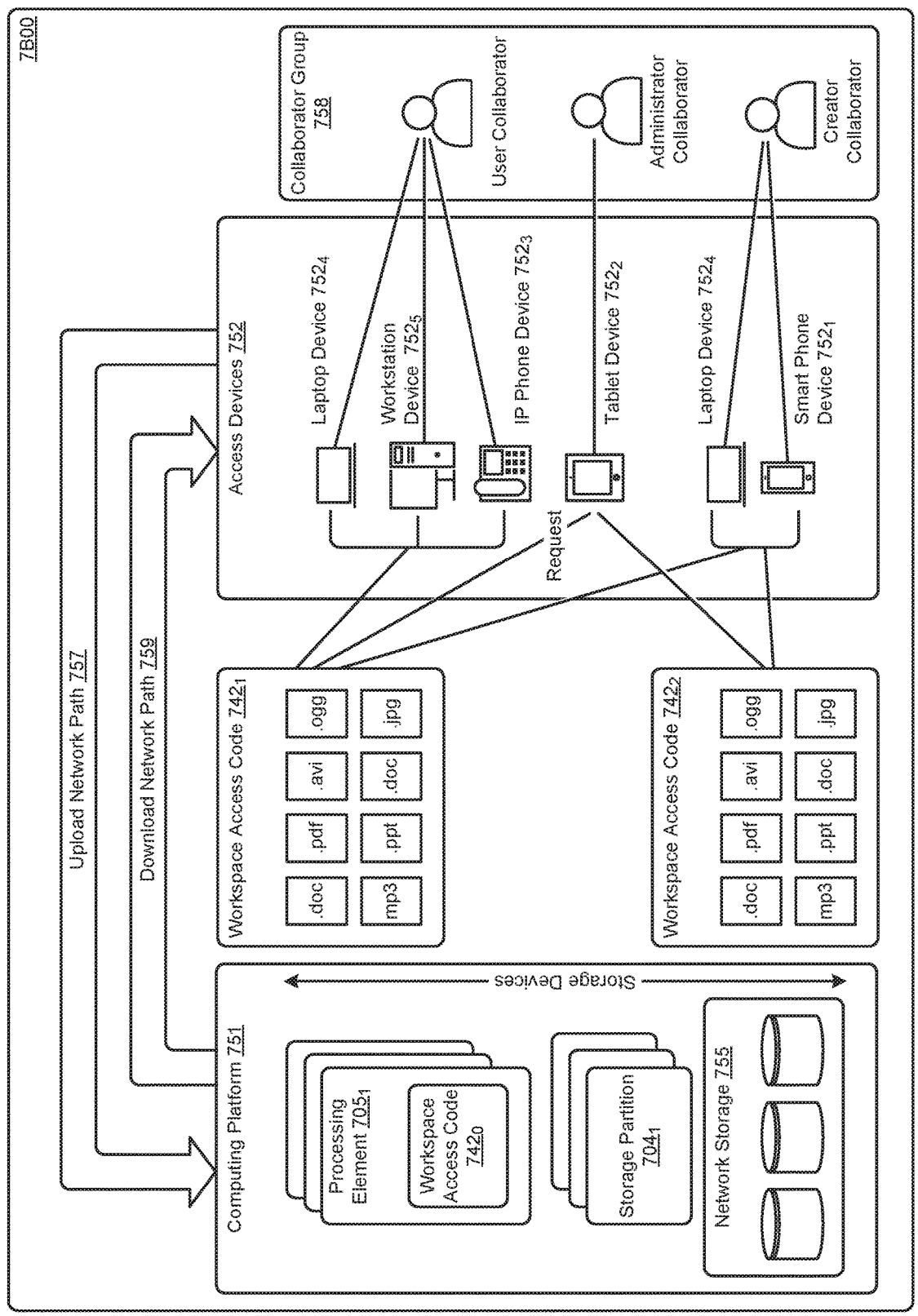

FIG. 7B depicts a block diagram of an instance of a cloud-based environment 7B00. Such a cloud-based environment supports access to workspaces through the execution of workspace access code (e.g., workspace access code 742$_0$, workspace access code 742$_1$, and workspace access code 742$_2$). Workspace access code can be executed on any of access devices 752 (e.g., laptop device 752$_4$, workstation device 752$_5$, IP phone device 752$_3$, tablet device 752$_2$, smart phone device 752$_1$, etc.). A group of users can form a collaborator group 758, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 751, including in a middleware setting. As shown, a portion of the workspace access code resides in and can be executed on one or more processing elements (e.g., processing element 705$_1$). The workspace access code can interface with storage devices such as networked storage 755. Storage of workspaces and/or any constituent files or objects, and/or any other code or scripts or data can be stored in any one or more storage partitions (e.g., storage partition 704$_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 757). A stored workspace can be delivered to a particular user and/or shared with other particular users via a download (e.g., a download from a processing element to an access device over a download network path 759).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for shared content collaboration between a user device and a cloud-based collaboration system, the method comprising:

identifying a configuration setting that specifies whether to display content in a browser of a user device, or whether to display the content using a non-browser application, wherein the content stored at a cloud-based collaboration system is linked to a URL (universal resource locator);

receiving a user selection of the URL for accessing the content, wherein the URL is displayed in a user interface of the user device; and responsive to the user selection of the URL, displaying at least a portion of the content using the non-browser application at least by:
intercepting, by an agent on the user device, the URL before the browser of the user device acts on the content via the URL;
receiving a set of metadata from the cloud-based collaboration system, the set of metadata corresponding to the content;
identifying a local instance of the content in local storage of the user device;
storing the set of metadata at the user device as remote view metadata that represented a last-known view of metadata for the content, wherein the last-known view comprises a representation of the metadata at the cloud-based collaboration system prior to the user device going offline from the cloud-based collaboration system;
opening the local instance using the non-browser application; and
storing the set of metadata at the user device as local view metadata that represents a then-current view of the metadata associated with a local instance of the content, wherein a change to the content at the user device is to be reflected in the local view metadata, and comparing the remote view metadata to the local view metadata is usable to determine an existence or absence of a delta between the content on the cloud-based collaboration system and the local instance in the local storage.

2. The method of claim 1, further comprising carrying out a synchronization protocol between the cloud-based collaboration system and the user device at least by:
detecting a change to the local instance by the non-browser application; and
synchronizing the change to the local instance with the content that is stored at the cloud-based collaboration system.

3. The method of claim 1, further comprising:
modifying the local instance of the content using the non-browser application while the user device is offline and disconnected from the cloud-based collaboration system.

4. The method of claim 3, wherein the non-browser application is launched based at least in part on a first file type associated with the local instance of the content.

5. The method of claim 4, wherein the content comprises an embedded content corresponding to a second file type, and the cloud-based collaboration system sends both a first set of metadata corresponding to the first file type and a second set of metadata corresponding to the second file type to the user device when the user device is online.

6. The method of claim 5, wherein the embedded content corresponds to a further non-browser application that is different from the non-browser application and is launched based at least in part upon the second file type.

7. The method of claim 6, further comprising responsive to the user selection of the URL, invoking a replication protocol that replicates at least one of a first updated portion the content or a second updated portion of metadata associated with the content from the cloud-based collaboration system to the user device based at least in part upon whether or not the local instance of the content is already in the local storage when receiving the user selection of the URL.

8. The method of claim 1, wherein the local instance of the content is received as one or more chunks, and only the one or more chunks, rather than the content in its entirety, are stored on the user device.

9. The method of claim 1, further comprising synchronizing the local instance comprising a change that exists on the user device but not on the cloud-based collaboration system with the content that is stored remotely on the cloud-based collaboration system, wherein the local instance of the content including the change is stored in at least one of a local cache or a local persistent storage, and the user device is offline when the change is made to the local instance of the content.

10. The method of claim 1, wherein a conflict resolution module at the cloud-based collaboration system detects a conflict between a modification of the content by a user and another modification to the content by another user, and further comprising receiving a broadcast of reconciled information for the content from the conflict resolution module at the cloud-based collaboration system, wherein the broadcast of the reconciled information is sent to the user and the other user.

11. The method of claim 1, further comprising:
performing one or more security checks before copying the content to the user device, wherein the user selection of the URL triggers invocation of a content management engine on the user device that intercepts the URL before the browser on the user device acts on the URL, wherein the one or more security checks confirm access rights to download the content, and the user selection of the URL further triggers invocation of a replication engine on the cloud-based collaboration system that replicates the content stored on the cloud-based collaboration system to the user device.

12. The method of claim 1, wherein identifying a local instance of the content in local storage of the user device is implemented by an instance of executable code at the user device that is downloaded from the cloud-based collaboration system.

13. A non-transitory computer readable medium having stored thereon a sequence of instructions which, when stored in memory and executed by one or more processors, causes the one or more processors to perform a set of acts for shared content collaboration between a user device and a cloud-based collaboration system, the set of acts comprising:
identifying a configuration setting that specifies whether to display content in a browser of a user device, or whether to display the content using a non-browser application, wherein the content stored at a cloud-based collaboration system is linked to a URL (universal resource locator);
receiving a user selection of the URL for accessing the content, wherein the URL is displayed in a user interface of the user device; and
responsive to the user selection of the URL, displaying at least a portion of the content using the non-browser application at least by:
intercepting, by an agent on the user device, the URL before the browser of the user device acts on the content via the URL;
receiving a set of metadata from the cloud-based collaboration system, the set of metadata corresponding to the content;

identifying a local instance of the content in local storage of the user device;

storing the set of metadata at the user device as remote view metadata that represented a last-known view of metadata for the content, wherein the last-known view comprises a representation of the metadata at the cloud-based collaboration system prior to the user device going offline from the cloud-based collaboration system;

opening the local instance using the non-browser application; and storing the set of metadata at the user device as local view metadata that represents a then-current view of the metadata associated with a local instance of the content, wherein a change to the content at the user device is to be reflected in the local view metadata, and comparing the remote view metadata to the local view metadata is usable to determine an existence or absence of a delta between the content on the cloud-based collaboration system and the local instance in the local storage.

14. The non-transitory computer readable medium of claim 13, further comprising instructions which, when stored in the memory and executed by the one or more processors, causes the one or more processors to perform acts of synchronizing the local instance comprising a change that exists on the user device but not on the cloud-based collaboration system with the content that is stored remotely on the cloud-based collaboration system, wherein the local instance of the content including the change is stored in at least one of a local cache or a local persistent storage, and the user device is offline when the change is made to the local instance of the content.

15. The non-transitory computer readable medium of claim 13, further comprising instructions which, when stored in the memory and executed by the one or more processors, causes the one or more processors to perform acts of carrying out a synchronization protocol between the collaboration system and the user device at least by:
detecting a change to the local instance by the non-browser application; and
synchronizing the change to the local instance with the content that is stored at the cloud-based collaboration system.

16. The non-transitory computer readable medium of claim 13, wherein a conflict resolution module at the cloud-based collaboration system detects a conflict between a modification of the content by a user and another modification to the content by another user, and further comprising instructions which, when stored in the memory and executed by the one or more processors, causes the one or more processors to perform acts of receiving a broadcast of reconciled information for the content from the conflict resolution module at the cloud-based collaboration system, wherein the broadcast of the reconciled information is sent to the user and the other user.

17. The non-transitory computer readable medium of claim 13, further comprising instructions which, when stored in the memory and executed by the one or more processors, causes the one or more processors to perform acts of:
modifying the local instance of the content using an editing mode of the non-browser application while the user device is offline and disconnected from the cloud-based collaboration system.

18. The non-transitory computer readable medium of claim 17, wherein the non-browser application is launched based at least in part on a first file type associated with the local instance of the content, the content comprises an embedded content corresponding to a second file type, and the cloud-based collaboration system sends both a first set of metadata corresponding to the first file type and a second set of metadata corresponding to the second file type to the user device.

19. A system for shared content collaboration between a user device and a cloud-based collaboration system, the system comprising:
a non-transitory storage medium having stored thereon a sequence of instructions; and
one or more processors that execute the sequence of instructions, wherein execution of the sequence of instructions causes the one or more processors to perform a set of acts, the set of acts comprising,
identifying a configuration setting that specifies whether to display content in a browser of a user device, or whether to display the content using a non-browser application, wherein the content stored at a cloud-based collaboration system is linked to a URL (universal resource locator);
receiving a user selection of the URL for accessing the content, wherein the URL is displayed in a user interface of the user device; and
responsive to the user selection of the URL, displaying at least a portion of the content using the non-browser application at least by:
intercepting, by an agent on the user device, the URL before the browser of the user device acts on the content via the URL;
receiving a set of metadata from the cloud-based collaboration system, the set of metadata corresponding to the content;
identifying a local instance of the content in local storage of the user device;
storing the set of metadata at the user device as remote view metadata that represented a last-known view of a metadata for the content, wherein the last-known view comprises a representation of the metadata at the cloud-based collaboration system prior to the user device going offline from the cloud-based collaboration system;
opening the local instance using the non-browser application; and
storing the set of metadata at the user device as local view metadata that represents a then-current view of the metadata associated with a local instance of the content, wherein a change to the content at the user device is to be reflected in the local view metadata, and comparing the remote view metadata to the local view metadata is usable to determine an existence or absence of a delta between the content on the cloud-based collaboration system and the local instance in the local storage.

20. The system of claim 19, further comprising instruction which, when executed by the one or more processors, cause the one or more processors to perform acts of:
detecting a change to the local instance by the non-browser application; and
synchronizing the change to the local instance with the content that is stored at the cloud-based collaboration system.

* * * * *